(12) United States Patent
Aramoto

(10) Patent No.: US 8,320,315 B2
(45) Date of Patent: Nov. 27, 2012

(54) MOBILE NODE, ACCESS GATEWAY, LOCATION MANAGEMENT DEVICE, AND MOBILE PACKET COMMUNICATION SYSTEM

(75) Inventor: Masafumi Aramoto, Osaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 375 days.

(21) Appl. No.: 12/668,623

(22) PCT Filed: Jul. 10, 2008

(86) PCT No.: PCT/JP2008/062447
§ 371 (c)(1),
(2), (4) Date: Jan. 11, 2010

(87) PCT Pub. No.: WO2009/008464
PCT Pub. Date: Jan. 15, 2009

(65) Prior Publication Data
US 2010/0202374 A1 Aug. 12, 2010

(30) Foreign Application Priority Data
Jul. 12, 2007 (JP) .................................. 2007-183666

(51) Int. Cl.
*H04B 7/212* (2006.01)
(52) U.S. Cl. ........................................... 370/329
(58) Field of Classification Search .................. 370/203, 370/204–215, 229–240, 241–253, 310–337, 370/338–350, 395.1–395.3, 395.4, 395.41, 370/395.42, 395.5, 395.52, 395.53, 412–421, 370/431–457, 458–463, 464–497, 498–522, 370/523, 520–529
See application file for complete search history.

(56) References Cited

U.S. PATENT DOCUMENTS
7,076,258 B2 * 7/2006 Motegi et al. .............. 455/456.1
(Continued)

FOREIGN PATENT DOCUMENTS
JP 2003-283546 A 10/2003
(Continued)

OTHER PUBLICATIONS
Levkowetz et al., "Draft-giaretta-netlmm-dt-protocol-01" NetLMM WG Internet- Draft, Sep. 18, 2006, pp. 1-56.

*Primary Examiner* — Kwang B Yao
*Assistant Examiner* — Jung-Jen Liu
(74) *Attorney, Agent, or Firm* — Birch, Stewart, Kolasch & Birch, LLP

(57) ABSTRACT

When a mobile station 1 transmits a packet to a mobile station 2, the mobile station 1 selects an MAG 1 based on a primer flag of the MAG in a default router list, and transmits the packet to the MAG 1 as a default router. The MAG 1 receives the packet and resolves an LMA by finding that a destination of the packet is not a mobile station associated with the MAG 1 from a location information management table. Then the MAG 1 transfers the packet to the LMA. A transfer unit sets a transfer source as the MAG1 and a transfer destination as the LMA, and transfers the packet by a transfer technique using encapsulation, a transfer technique such as GRE tunneling, or MPLS. The LMA searches the location information management table based on the mobile station 2 as the destination of the packet, acquires an MAG 3 whose primer flag is ON, and then transfers the packet to the MAG 3. This allows each of the mobile stations to establish multiple communication paths via multiple communication networks, and to select an optimal path to deliver a packet in a mobile communication system complying with the Edge Mobility and provided with mobile stations, access gateways, and a location management device.

12 Claims, 9 Drawing Sheets

U.S. PATENT DOCUMENTS

| | | |
|---|---|---|
| 8,073,565 B2 * | 12/2011 | Johnson .................. 700/245 |
| 8,095,681 B2 * | 1/2012 | Yumoto et al. ............. 709/232 |
| 2001/0034232 A1 * | 10/2001 | Kuwahara ................. 455/435 |
| 2003/0050078 A1 * | 3/2003 | Motegi et al. .............. 455/456 |
| 2003/0109254 A1 * | 6/2003 | Motegi et al. .............. 455/435 |
| 2003/0134638 A1 * | 7/2003 | Sundar et al. .............. 455/435 |
| 2004/0248574 A1 * | 12/2004 | Watanabe et al. .......... 455/435.1 |
| 2005/0078633 A1 | 4/2005 | Watanabe et al. |
| 2005/0119001 A1 | 6/2005 | Watanabe |
| 2007/0177530 A1 * | 8/2007 | Ando et al. ................. 370/277 |
| 2008/0218405 A1 * | 9/2008 | Eckhart ...................... 342/146 |

FOREIGN PATENT DOCUMENTS

| | | |
|---|---|---|
| JP | 2003-319461 A | 11/2003 |
| JP | 2005-159929 A | 6/2005 |
| JP | 2006-166124 A | 6/2006 |
| WO | WO 2007/033116 A1 | 3/2007 |

* cited by examiner

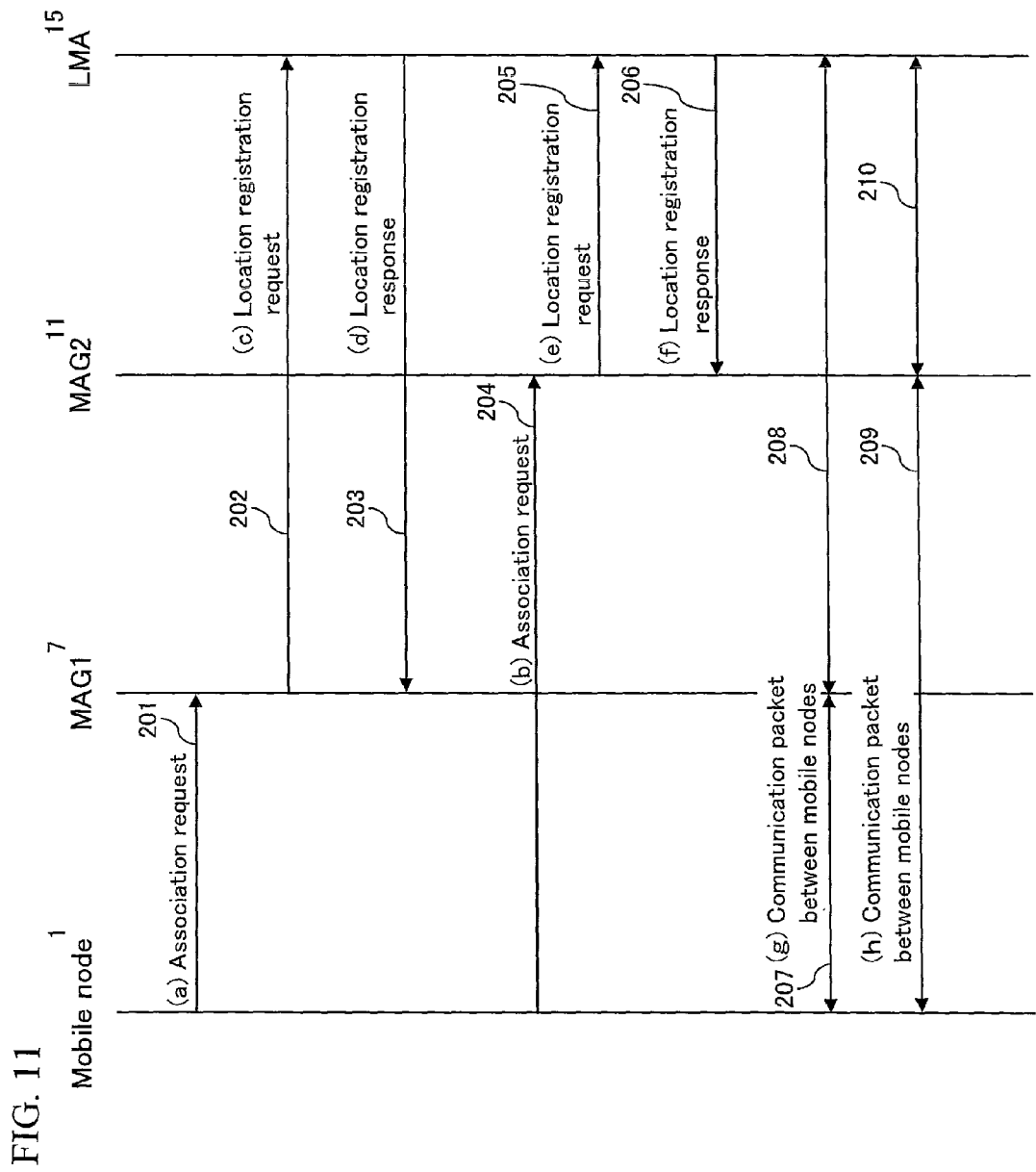

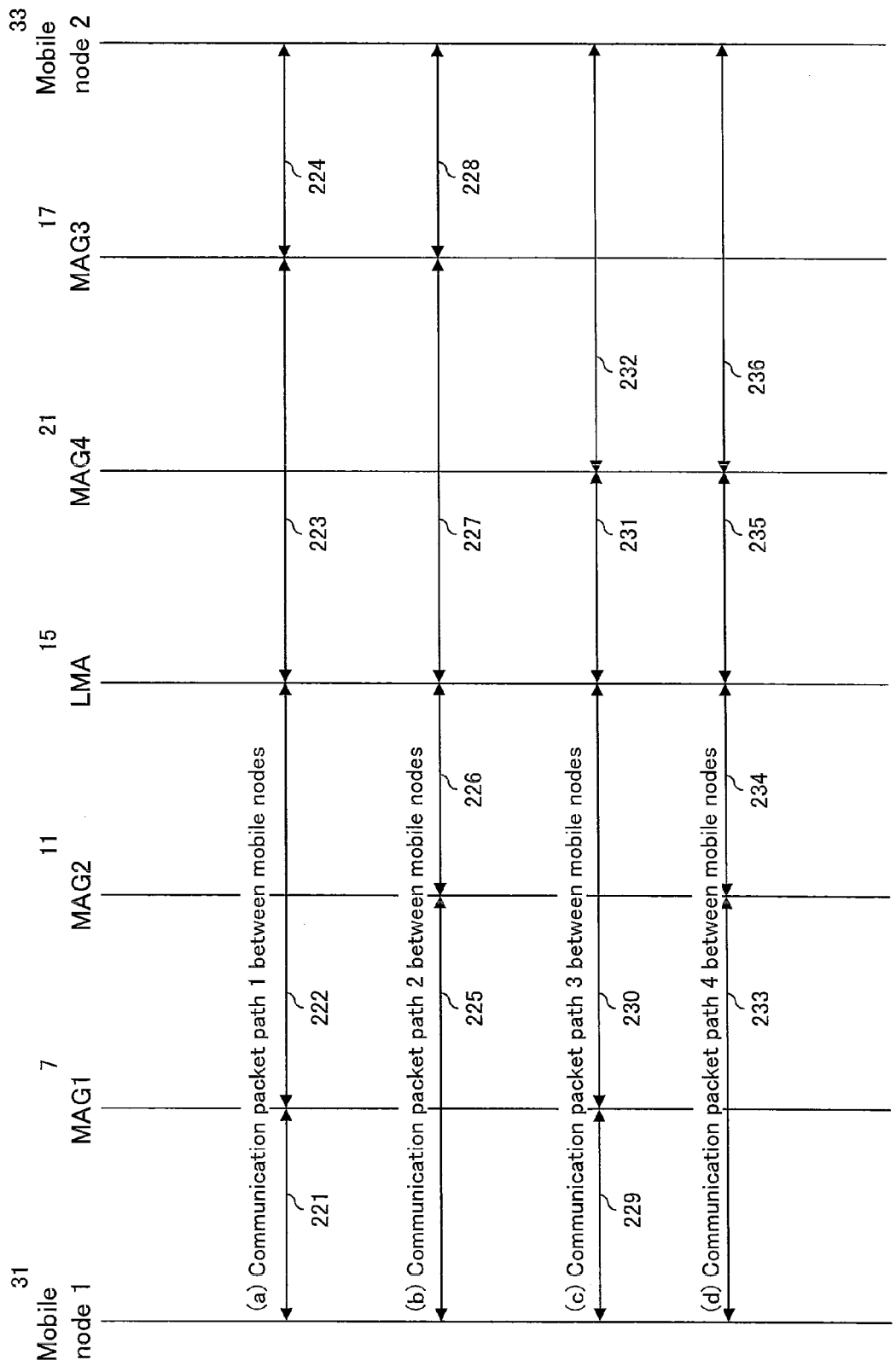

MOBILE NODE, ACCESS GATEWAY, LOCATION MANAGEMENT DEVICE, AND MOBILE PACKET COMMUNICATION SYSTEM

TECHNICAL FIELD

The present invention relates to a mobile node, an access gateway, a location management device, and a packet communication system in a packet communication system in accordance with the Edge Mobility.

BACKGROUND ART

Edge Mobility is known as a technique that provides mobility with IP layer, with which, even if a link connected to a node is changed one after another in the Internet as the node moves, communications with a communication partner node can be continued (see Non-patent Document 1, for example).

According to the Edge Mobility, as shown in FIG. 1, defined are: a core network 5, which is a network to which mobile nodes 1, 3 are connected; access gateways (MAG: Mobile Access Gateway) 7, 11 serving as default routers for the mobile nodes 1, 3; and location management device (LMA: Local Mobility Anchor) 15 that manages MAGs 7, 11 with which the mobile nodes 1, 3 are associated.

Using the MAGs 7, 11 to which the mobile nodes 1, 3 are connected as location information of the mobile nodes 1, 3, the LMA 15 manages a correspondence between identification information of the mobile nodes and that of the MAGs (15a). As the mobile nodes 1, 3 move, the LMA 15 maintains the location information by constantly updating the MAGs 7, 11 to which the mobile nodes 1, 3 are connected.

The mobile nodes 1, 3 hold unique IP addresses for identifying themselves, and specify the IP addresses as a transmission destination and a transmission source of transmission/reception packets between the mobile nodes 1, 3. Then, the mobile nodes 1, 3 transmit the packets to the core network 5. The MAGs 7, 11, which serve as connection points to the mobile nodes 1, 3 in the core network 5 transfer the packets to the LMA 15. From the location information 15a, the LMA 15 acquires the MAG (e.g., the MAG 11) with which the mobile node as the transmission destination (e.g., the mobile node 3) is associated, and transfers the corresponding packet to the MAG.

Thus, within the core network 5, the packet between the mobile nodes 1, 3 is delivered through packet transfer by the MAGs and the LMA.

A specific example of the packet delivery will be described with reference to FIG. 1 and FIG. 2.

For example, the mobile node (1)1 transmits a packet addressed to the mobile node (2)3 (FIG. 2(a)). The transmission source of the packet has the IP address of the mobile node (1)1, and the address of the transmission destination is the IP address of the mobile node (2).

The transmitted packet is received by the MAG (1)7, which is a default router for the mobile node (1)1. The MAG (1)7 transfers the packet to the LMA 15 in the core network 5. A unit for the transfer may be achieved, for example, by a transfer using packet encapsulation by the MAGs and the LMA (see FIG. 2(b)), tunneling using GRE tunneling (see Non-patent Document 2), or label switching using MPLS (see Non-patent Document 3).

The LMA 15 acquires the MAG (2)11 from the location information of the mobile node (2)3, which is the destination of the transferred packet, and transfers the packet to the MAG (2)11 (FIG. 2(c)).

Since the MAG (2)11 is associated with the mobile node (2)3, that is, the destination of the transferred packet, the MAG (2)11 delivers the packet to the mobile node (2) (FIG. 2(d)). Thus, the packet from the mobile node (1)1 to the mobile node (2)3 is delivered through a transfer based on the location information managed by the MAGs and the LMA within the core network 5. A packet from the mobile node (2)3 to the mobile node (1)1 is delivered by following the above-mentioned steps in reverse order (FIG. 2(e)-2(h)) while the transmission source and the transmission destination in the IP header of the packet are swapped.

In the Edge Mobility, the above-mentioned method allows each mobile node to continue communications only by changing the MAG which is the default router with the movement of the mobile node. Within the core network, communications between the mobile nodes is achieved by updating the location information and performing packet transfer at the LMA and the MAGs. Thereby, the Edge Mobility has an advantage that movement process performed by the mobile nodes is minimized, and the number of control signals in wireless communication area is reduced.

Non-patent Document 1: H. Levkowetz, Ed, et al., "draft-giaretta-netlmm-dt-protocol-01" NetLMM WG Internet-Draft Sep. 18, 2006
Non-patent Document 2: Farinacci, D. et al., "Generic Routing Encapsulation(GRE)", RFC 2784, March 2000.
Non-patent Document 3: Rosen, E., et al., "Multiprotocol Label Switching Architecture", RFC 3031, January 2001.
Non-patent Document 4: 3GPP TS 23.003V5.2.0, "Numbering, addressing and identification(Release 6)," March, 2004.

DISCLOSURE OF THE INVENTION

Problems to be Solved by the Invention

However, the above-mentioned background art has the following problems.

In the Edge Mobility, each mobile node is identified by an identifier which identifies the mobile node uniquely in the system. As the identifier, an ID assigned by an operator and identifying the mobile node individually, such as a telephone number or subscriber information may be used. In addition, an IP address may also be used as the identifier. The LMA manages the MAG connected to the mobile node as the location information for the identification information of the mobile node. When the MAG connected to the mobile node is changed with the movement of the mobile node, corresponding information is updated at the LMA. Conventionally, the LMA manages a single MAG as location information for a mobile node (the MAG 1 for the mobile node 1 and, and the MAG 2 for the mobile node 2). Thus, there arises a problem that a mobile node cannot be connected to multiple wireless access systems concurrently and thus the multiple connected MAGs cannot be registered with the LMA as location information.

Examples of connection of the mobile node to multiple wireless access systems include a case where a mobile communication terminal like a mobile phone, for example, is provided with a transmission/reception device for connecting to a wireless access system which connects to a cellular network, and another wireless access system which connects to a wireless LAN. This is an example that, by using a single IP address, the mobile communication terminal holds multiple communication paths to a communication partner via wireless access systems, respectively.

Specifically, as shown in FIG. 3, mobile nodes 31, 33 are provided with multiple transmitter-receivers 31a, 31b, and 33a, 33b, and are associated with distinct MAGs 7, 11, and 17, 21 in the core network 5. The transmitter-receivers 31a, 31b are respectively connected by different wireless access systems. Similarly, the transmitter-receivers 33a, 33b are connected by respective different wireless access systems. For example, one of the transmitter-receivers is connected by a wireless access system such as a cellular network used for a cellular phone, and the other is connected by a wireless access system such as a wireless LAN. That is, the mobile nodes 31, 33 are connected concurrently by using two wireless access systems, the cellular network and the wireless LAN. MAGs to be connected by respective access systems are provided like MAG (1)7 and MAG (2)11 as shown in FIG. 3, and thereby each MAG allows a connection of the mobile node 31 via a single access system. If the mobile node (1)31 can be connected to the core network 5 using the multiple transmitter-receivers 31a, 31b concurrently as shown in FIG. 3, the mobile node 31 having both the access system of the cellular network and the access system of the wireless LAN will be able to use both systems concurrently, and to use for different purposes by simply selecting either one depending on factors such as a state of a wireless link and a characteristic of an application. For example, if the wireless LAN has a higher transmission capability, and the mobile node needs communications for an application involving a large amount of data transmission/reception, the communications will be made by the access system of the wireless LAN. Alternatively, when a large amount of data transmission is not needed and the mobile node is moving at a high speed, the communications will be made by the cellular system.

However, as shown in FIG. 3, when the mobile node (1)31 is provided with transmitter-receivers 31a, 31b connected to the multiple wireless access systems, and is connected to the core network 5 via the respective transmitter-receivers 31a, 31b, the LMA 15 cannot perform location management using, as location information, the MAG (1)7 and the MAG (2)11, which are the connection points. Similarly, there is a problem that the LMA 15 does not have a unit for selecting either one of the path through the MAG (1)7 and the path through the MAG (2)11 in packet transfer to the mobile node (1)31.

An object of the present invention is to provide a unit for allowing a mobile node including multiple transmitter-receivers connectable respectively to multiple access networks to perform communications using a single IP address by establishing multiple communication paths through respective access systems in a network based on the Edge Mobility.

Another object is to provide a mobile node, an access gateway, a location management device, and a packet communication system that achieve a hand over allowing the mobile node to continue communications by switching wireless access systems while performing the communications using a single IP address.

Unit for Solving the Problems

The above-mentioned problems can be solved by the following unit.

(Mobile Node)

A mobile node according to the present invention is a mobile node in a packet communication system complying with the Edge Mobility and configured by including: a mobile node; an access gateway (MAG: Mobile Access Gateway); and a location management device (LMA: Local Mobility Anchor), the mobile node including: a location registration notification unit for performing a location registration for MAGs, the location registration notification unit including transmitter-receivers respectively using multiple network access systems connected to a core network, the transmitter-receivers being configured to be respectively connected to the MAGs; a storage unit for acquiring path information related to all the MAGs connected through the access systems of the respective transmitter-receivers and for storing the path information; and a transmission unit for transmitting a packet based on the path information. The mobile node further includes: a selection unit for selecting an MAG to be preferentially used from the multiple MAGs connected; a notification unit for notifying of the MAG thus selected; and a packet transmission unit for transmitting a packet to the selected MAG.

By the above-mentioned configuration, the mobile node can be connected to the core network through the multiple wireless access systems, and connected to the core network by the MAGs different from each other via the respective access systems, so that multiple communication paths can be established. In addition, the mobile node can perform a handover to continue communications with a node to be a communication partner by selecting a MAG to be preferentially used, notifying the MAG of the selection, and switching between the wireless access systems.

(Access Gateway: MAG)

A MAG according to the present invention is an access gateway for a mobile node in a packet communication system complying with the Edge Mobility and includes: a unit for performing a location registration of a mobile node associated with the MAG itself on the LMA, for establishing a transfer path between the MAG and the LMA for the mobile node, for receiving a notification indicating that the MAG to be preferentially used is selected by the mobile node, and for notifying the LMA that the MAG is selected.

With this configuration, the multiple MAGs may be notified to the LMA as location information of the mobile node. Further, the MAG selected by the mobile node can be notified to the LMA.

(Location Management Device: LMA)

A LMA holds multiple access gateways as location information of a mobile node and setting one of the access gateways as a transfer destination of a packet addressed to the mobile node, the access gateways connecting to a network through multiple access systems of the mobile node and serving as respective connection points.

A LMA according to the present invention is a location management device existing in a packet communication system complying with the Edge Mobility and includes: a registration unit for acquiring multiple MAGs as location information for the mobile node and for registering the location information; a registration unit for acquiring one of the MAGs which is to be preferentially used by the mobile node and for registering the MAG; and a packet transmission unit for selecting the MAG based on the selection information and for transmitting a packet to the mobile node.

With this configuration, the LMA can establish multiple communication paths via the multiple MAGs for the mobile node. Furthermore, packet delivery may be made preferentially via the MAG selected by the mobile node.

(Communication System)

Furthermore, a packet communication system according to the present invention is a packet communication system complying with the Edge Mobility and including: a mobile node; a MAG; and a LMA. The mobile node has multiple transmitter-receivers connected to multiple access systems and connects to a core network through the access systems. Moreover, the mobile node has: a location registration notification unit for performing a location registration for the MAGs connected through the respective access systems; a storage unit for acquiring path information related to all the MAGs and for storing the path information; and a transmission unit for transmitting a packet based on the path information. The MAG is an access gateway for the mobile node, and has a unit for performing a location registration of the mobile node associated with the MAG on the LMA, for receiving a notification of selection of the MAG by the associated mobile node, and for notifying the LMA of the selected MAG. The LMA is a location management device and has: a registration unit for acquiring multiple the MAGs as location information for the mobile node and for registering the location information; a registration unit for acquiring one of the MAGs which is selected by the mobile node and for registering selection information; and a packet transmission unit for selecting the MAG based on the selection information and for transmitting a packet to the mobile node.

With this configuration, it is possible for the mobile node to connect to the core network through the multiple access systems, and to determine an access system to be preferentially used for transmission/reception of communication data. In addition, it is possible for the LMA in the core network to have multiple transmission paths for the mobile node, and to select a preferred path desired by the mobile node to deliver a packet on the path.

Further, by switching, for a preferred path, between paths between the mobile node and the LMA, a hand-over with the access system changed by the mobile node can be achieved.

(Communication Methods)

According to another aspect of the present invention, provided is a mobile node control method in a packet communication system complying with the Edge Mobility and configured by including: a mobile node, an access gateway; and a location management device, the control method characterized by including: a location registration notification step of performing a location registration for access gateways to which transmitter-receivers are connected using multiple network access systems connected to a core network; a step of acquiring path information related to all the access gateways connected through the access systems of the respective transmitter-receivers and of storing the path information; and a step of transmitting a packet based on the path information.

Furthermore, it is preferable to include: a step of selecting an access gateway to be preferentially used from the multiple access gateways connected; a step of notifying of the access gateway thus selected; and a step of transmitting a packet for the selected access gateway. The control method may be a program to cause a computer to perform the above steps, or a recording medium to record the program. A method of obtaining the program may be a transmission medium.

Effects of the Invention

According to the present invention, a mobile node complying with the Edge Mobility is connected to the core network through the multiple access systems to establish the multiple communication paths. Further, communications may be made concurrently via the multiple communication paths using a single IP address. Moreover, the mobile node can perform a hand-over in which switching between the access systems is performed to continue the communications with a single IP address.

Thereby, when a large-scale network operated by a communication common carrier or the like is constructed in compliance with the Edge Mobility, the communication common carrier can allow a mobile node to be connected with multiple wireless access systems.

The mobile node may be connected to the communication common carrier network via a wireless access system of a cellular network and an access system such as WLAN, concurrently. Furthermore, the mobile node can perform communications via both the access systems using a single IP address. Accordingly, for example, a communication common carrier can control via an access system of a cellular network or via an access network such as WLAN according to an application or their preference.

While conventional hand-over step is performed by switching from one connection to the other, the hand-over according to the present invention allows the mobile node to connect concurrently, thus can be performed seamlessly by just selecting a communication path for communication data after completing the concurrent connection step.

BRIEF DESCRIPTION OF THE DRAWINGS

FIG. 11 shows a sequence diagram of an information flow.

FIG. 12 shows a sequence diagram of a communication flow between mobile nodes.

DESCRIPTION OF SYMBOLS 5 core network,
7, 11, 17, 21 MAG
15 LMA,
31, 33 mobile node
31*a*, 31*b*, 33*a*, 33*b* transmission/reception devices

BEST MODES FOR CARRYING OUT THE INVENTION

Figure 1:
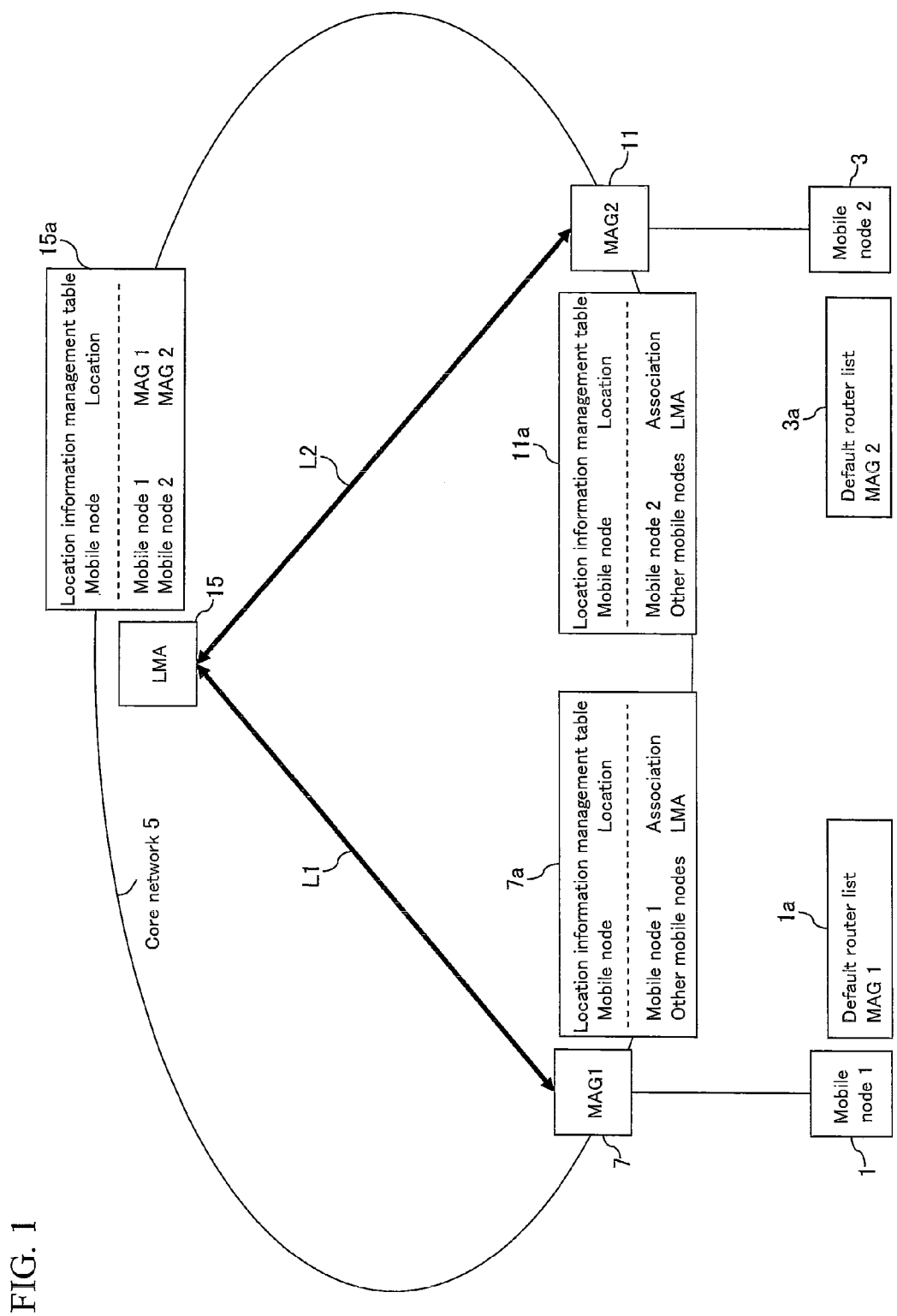
FIG. 1 shows a functional block diagram of one configuration example of an Edge Mobility packet communication system.
Figure 2:
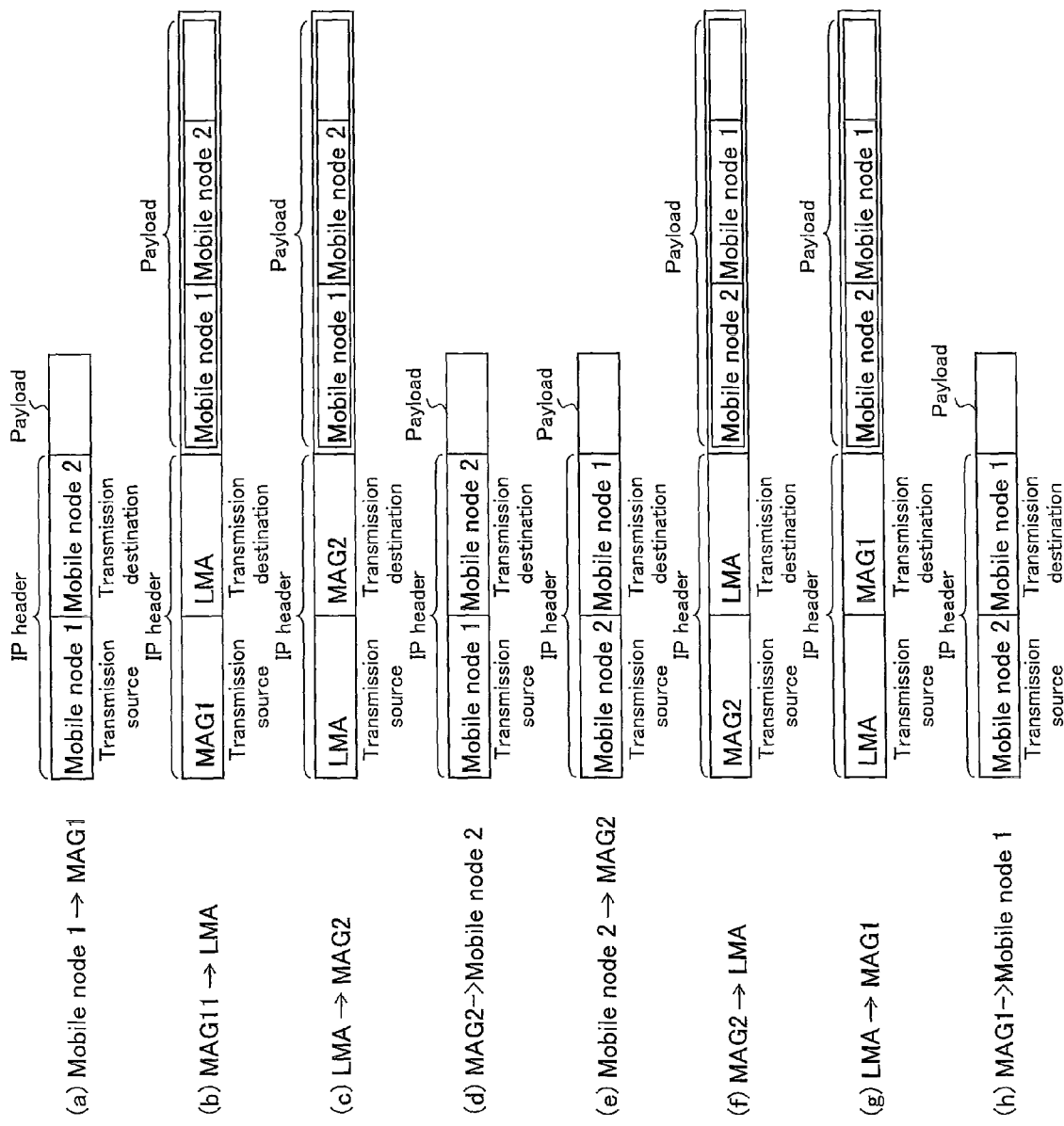
FIG. 2 shows a specific example of a packet delivery in the system shown in FIG. 1.
Figure 3:
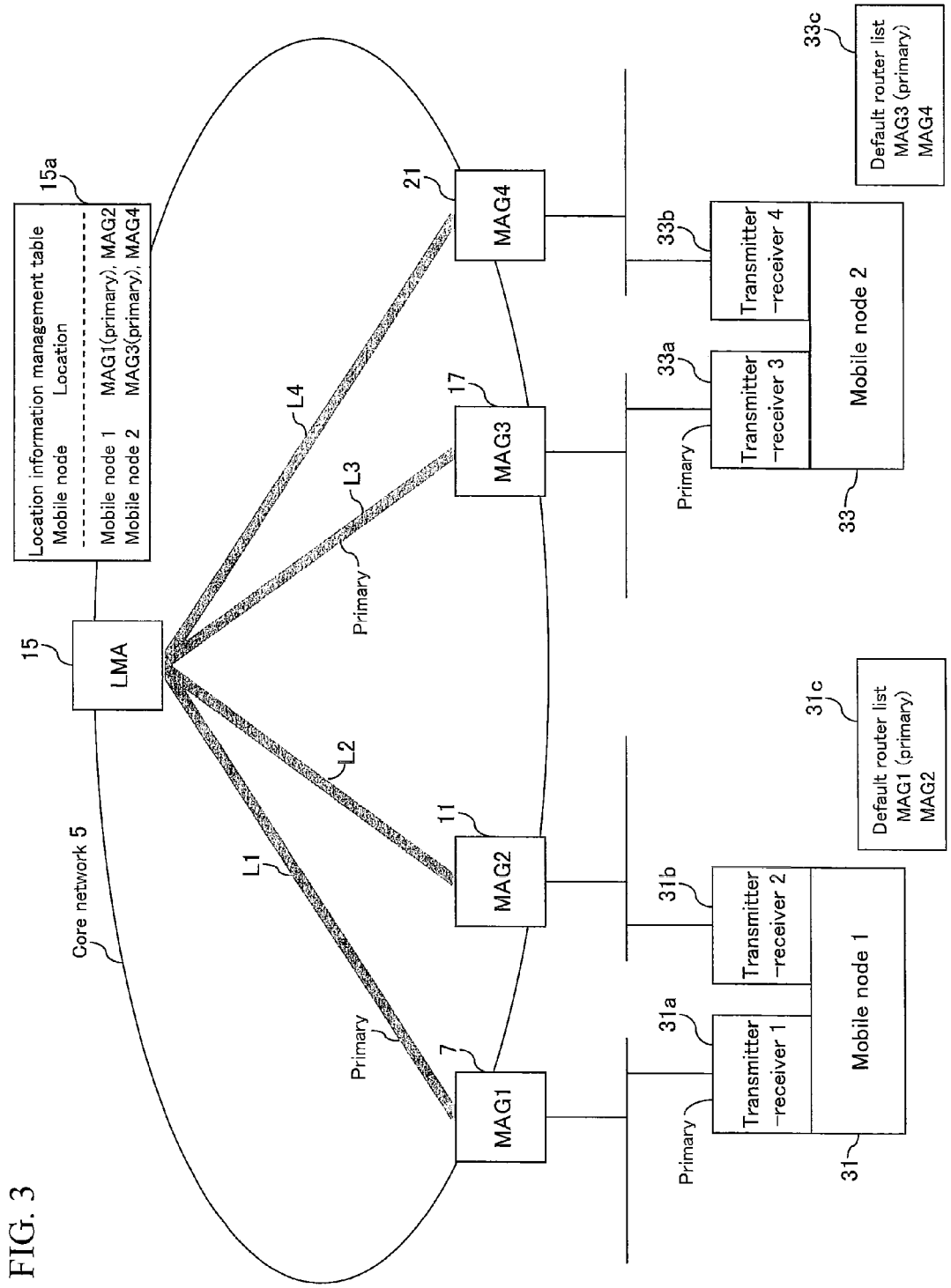
FIG. 3 shows a functional block diagram of one configuration example of the packet communication system according to one embodiment of the present invention.

A packet communication system according to one aspect of the present invention will be described below with reference to the drawings. A communication technique according to the present embodiment is in accordance with the Edge Mobility, and as shown in FIG. 3, mobile nodes connect to a core network via multiple network connection points, and multiple access gateways (MAG: Mobile Access Gateway) as default routers of the mobile nodes as well as a location management system (LMA: Local Mobility Anchor) are arranged within a core network.

(Mobile Node Configuration)

Figure 4:
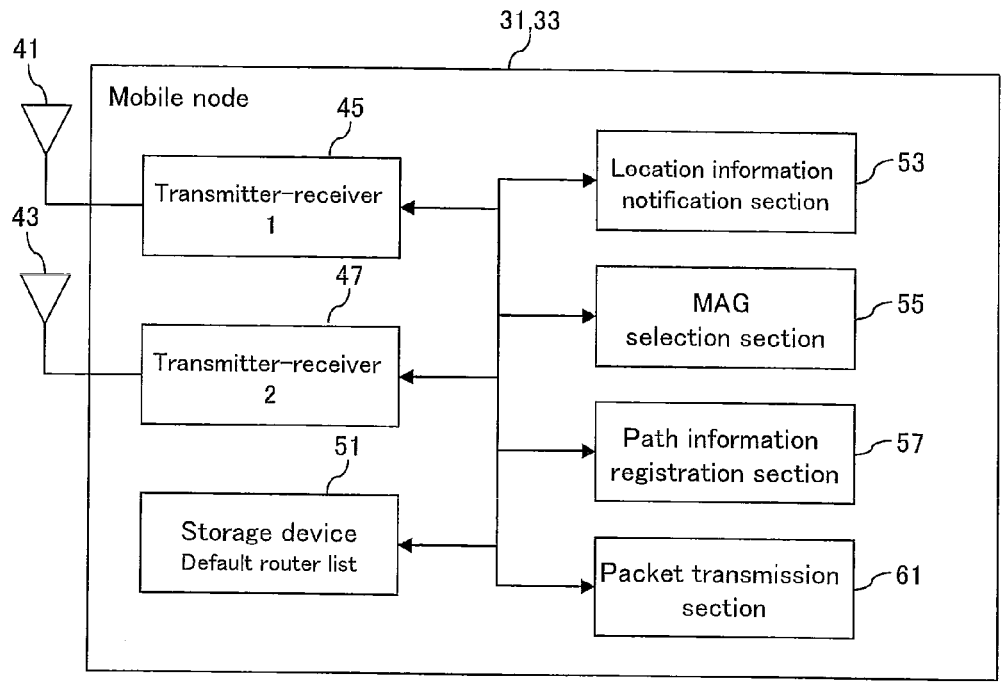
FIG. 4 shows a functional block diagram of one configuration example of a mobile node.

First, mobile nodes according to this embodiment will be described. As shown in FIG. 4, mobile nodes (MN)31, 33 include: transmitter-receivers (1)45, (2)47 having two or more antennas (two antennas 41, 43 in this embodiment); and a storage device 51, and further include a location information notification section 53 connected to the transmitter-receivers (1)45, (2)47 and the storage device 51; an MAG selection section 55; a path information registration section 57; and a packet transmission section 61.

Transmitter-receivers (1)45, (2)47 have antennas 41, 43 which perform wireless communication, and perform packet transmission/reception. A wireless communication system performs a wireless connection with the mobile nodes 31, 33 by a system for wireless communications in a wireless LAN, wireless communications in a cellular network, or a short-distance wireless communications using Bluetooth or the like.

The storage device 51 stores a default router list which manages MAG information for potential default routers. The path information includes multiple pieces of MAG information, and the storage device 51 also stores MAG selection information used by the mobile nodes for communication.

The location information notification section 53 detects a change of connected MAG, and notifies the core network of identification information for identifying a corresponding one itself of the mobile nodes.

The path information registration section 57 acquires information of an MAG to be default router to register the information with the default router list stored in the storage device 51.

The MAG selection section 55 selects an MAG to be used for communication from multiple MAGs registered with the default router list stored by the storage device 51, and notifies the core network of the selected MAG while registering the selected MAG with a storage section.

The packet transmission section 61 transmits a packet to the MAG based on the default router list of the storage device 51.

(Access Gateway: MAG Configuration)

Figure 5:
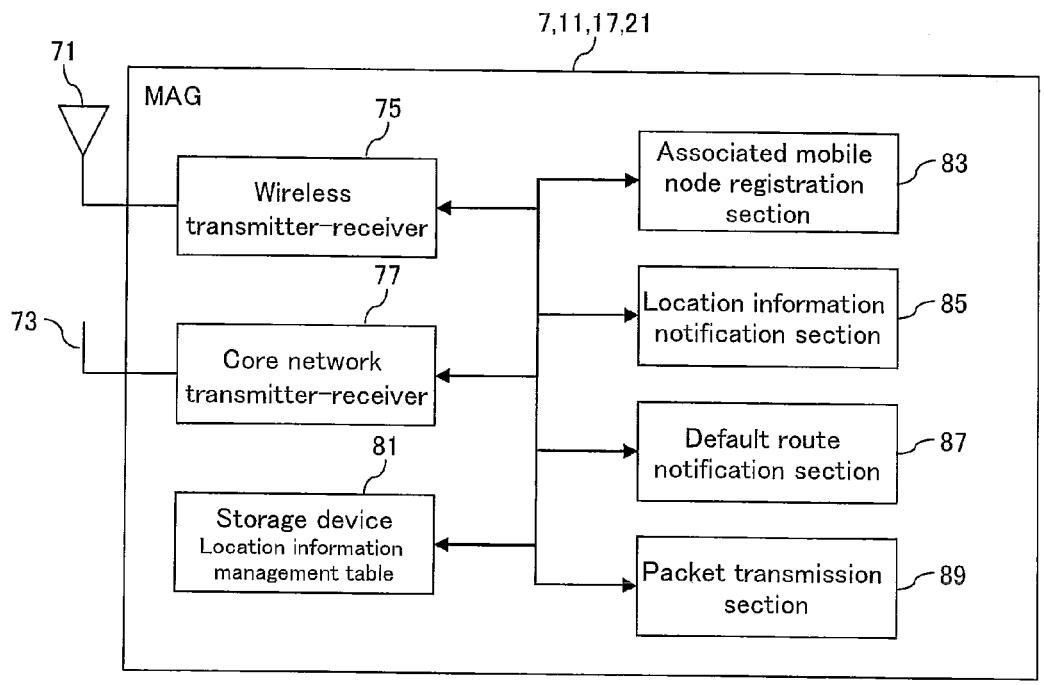
FIG. 5 shows a functional block diagram of one configuration example of an access gateway (MAG).

Next, MAGs according to this embodiment will be described. As shown in FIG. 5, each of the MAGs includes: a wireless transmitter-receiver 75 having antennas 71, 73; a core network transmitter-receiver 77 to be connected to the core network; and a storage device 81, and further includes an associated mobile node registration section 83, a location information notification section 85, a default route notification section 87, and a packet transmission section 89, each of which are connected to the transmitter-receivers 75, 77 and the storage device 81.

The wireless transmitter-receiver 75 has the antenna 71 for wireless communication, and transmits and receives packets. A wireless communication system performs a wireless connection with the mobile nodes by a system for wireless communications in a wireless LAN, wireless communications in a cellular network, or a short-distance wireless communications using such as Bluetooth or the like.

The core network transmitter-receiver 77 connects to the core network, and transmits and receives packets. A wired connection is performed by using a L2 technique, such as Ethernet (registered trademark), which is used between routers for the Internet.

The associated mobile node registration section 83 registers a mobile node associated with the MAG with a location information management table of the storage section. In addition, the MAG selection information notified by the mobile node is also registered with the storage section.

The default route notification section 87 notifies the mobile node associated with the MAG of information on the MAG. The information notified is path information for the mobile nodes to set the MAG as their default router.

The location information notification section 85 notifies the LMA of the MAG information as location information, and the identification information of the mobile node associated with the MAG. The MAG selection information notified by the mobile node is further notified to the LMA.

The storage section 81 stores the LMA in addition to the above-mentioned location information of the mobile node. To set the LMA as a destination of a packet addressed to a mobile node other than the associated mobile node, location information of the mobile node other than the associated mobile node is used for the LMA. To acquire the LMA information, the LMA has been set by an MAG administrator, or has been set varying with the mobile node according to the notification from the mobile node along with the location registration.

The packet transmission section 89 determines a transmission destination based on the location information management table of the storage device 81, and transfers packets addressed to the associated mobile node while transferring the other packets to the LMA.

(Configuration of LMA)

Figure 6:
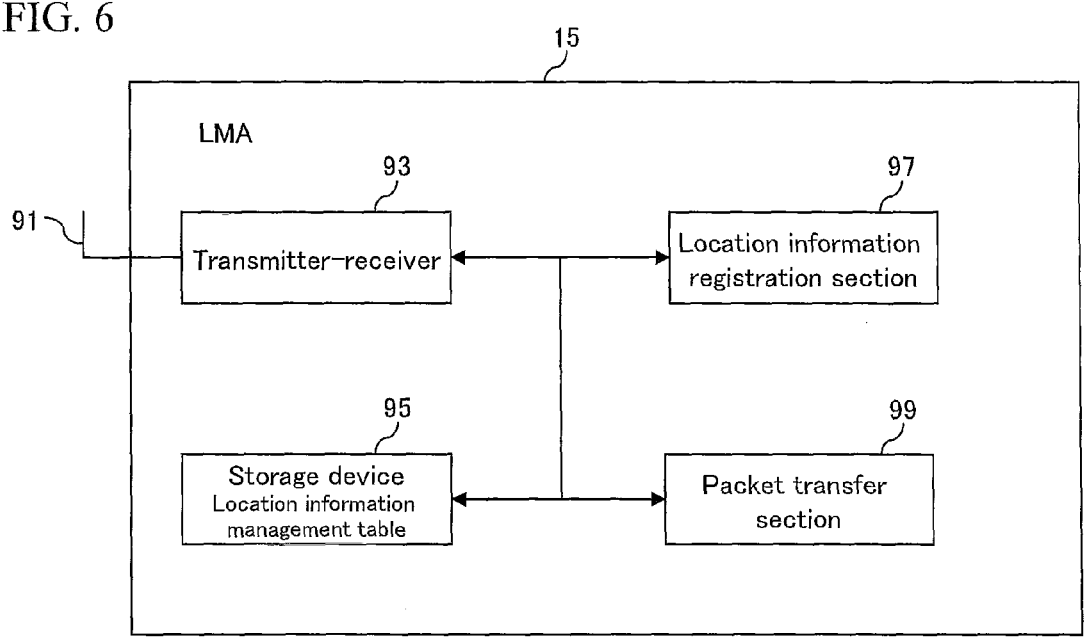
FIG. 6 shows a functional block diagram of one configuration example of a location management device (LMA).

Next, the LMA according to this embodiment will be described. As shown in FIG. 6, the LMA includes a transmitter-receiver 93 connected to a core network 91, and a storage device 95, and further includes a location information registration section 97 and a packet transfer section 99, each of which is connected to the transmitter-receiver 93 and the storage device 95.

The transmitter-receiver 93 is connected to the core network 91, and transmits and receives packets. A wired connection is performed by using the L2 technique such as Ethernet, which is used between routers for the Internet.

The location information registration section 97 registers location information notified by each MAG with the location information management table of the storage device 95. The MAG is registered as location information for a corresponding one of the mobile nodes. Multiple MAGs, which are location information pieces, may be registered for one mobile node. In addition, from a notification from one of the MAGs, the LMA acquires MAG selection information showing that the MAG has been selected by a corresponding one of the mobile nodes, and the information is registered with the location information management table of the storage device 95.

The packet transfer section 99 selects a MAG based on the location information management table of the storage device 95, and transfers a packet for a mobile node to the MAG.

(Location Information Creation Process)

Next, a process flow of location information creation by each node will be described.

(Location Information Creation Process by Mobile Node)

Figure 7:
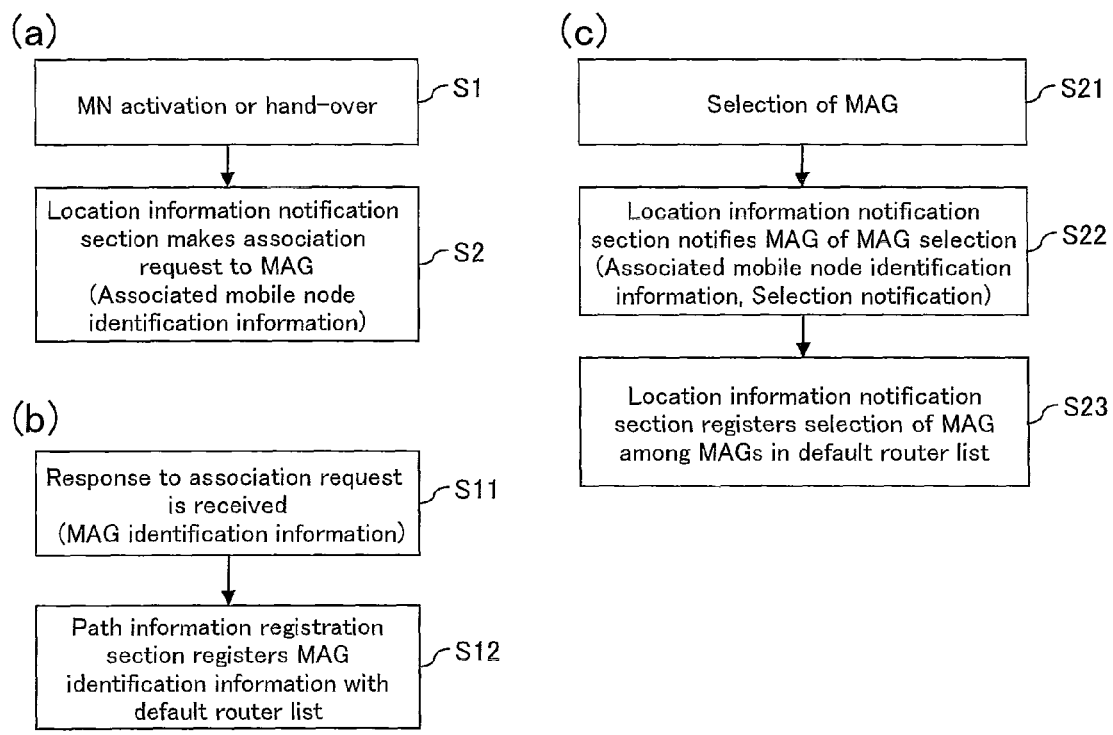
FIG. 7 shows a flowchart of a process flow of a mobile node.

When a mobile node is activated or a hand-over is performed to change MAGs as the mobile node moves, the mobile node requests a hand-over target MAG to associate the mobile node with the MAG FIG. 7(*a*) is a flowchart showing a process flow. FIG. 11(*a*) is a sequence diagram showing an information flow.

More specifically, when the mobile node 1 is activated (step S1) as in a case where the power is turned on, for example, the mobile node 1 makes an association request by transmitting, for example, an Association Request message of RRC (Radio Resource control) to the MAG (1)7 (201: step S2). Selection of an MAG for association in this case may be made by using a result of a cell search over broadcast information received from a neighboring base station using a wireless access system.

If an MAG with higher quality than the currently associated MAG is found as a result of the cell search using the wireless access system, the MAG is replaced with the MAG with higher quality. To change the MAGs, a hand-over is performed by transmitting, for example, a Reassociation Request message of RRC to make a reassociation request.

Specifically, the location information notification section 53 transmits an Association Request/Reassociation Reauest message by including the identification information of the mobile node. The mobile node may be identified by using the global IP address or the MAC address of the mobile node, or a UE-ID defined by a specification such as 3GPP TS23.003V5.2.0. Alternatively, a combination of these may also be used to identify the mobile node.

Upon completion of the process for the association request, the MAG transmits an Association Response/Reassociation Response message of RRC to reply to the mobile node. The details will be described later.

The mobile node receives the Association Response/Reassociation Response from the MAG through the path information registration section 57 (Step S11), and registers the MAG identification information such as the IP address or the MAC address of the MAG with a path control table of the storage section. The process flow is shown in FIG. 7(b).

The mobile node is provided with respective transmitter-receivers for multiple access systems that the mobile node has, and performs the above-described processes for MAGs connected to respective access systems to hold the multiple MAGs in the default router list of the storage device 51 (Step S12). The information flow is shown in FIG. 11(b) (204).

In the aforementioned manner, the mobile node is connected to the multiple MAGs through the respective access systems to hold paths to the multiple MAGs for identification information of the single mobile node.

(Location Information Creation Process by MAG)

Next, a location information creation process by each MAG will be described. The MAG registers the mobile node associated with the MAG and the location information of the LMA, and transfers transmission/reception packets for the mobile node.

Specifically, the associated mobile node registration section 83 registers the identification information of the mobile node received from the mobile node (Step S31, with the location information management table of the storage device 81 (Step S32). To obtain the information, for example, Association Request/Reassociation Request transmitted by the mobile node is used (Step S33). The global IP address or the MAC address of the mobile node, or the UE-ID defined by a specification such as 3GPP TS23.003V5.2.0 may be used for the identification information. The process flow is shown in FIG. 8(a).

The MAG registers the identification information of the LMA with the location information management table of the storage device. The information of the LMA is obtained through the setting by an MAG administrator or a notification from the mobile node. When obtained through the notification from the mobile node, the information of the LMA is obtained by including the LMA information, for example, in the Association Request/Reassociation Request. The LMA is identified by the IP address of the LMA, which implements routing in the core network.

Then, the MAG registers the location of the associated mobile node with the LMA through the location information notification section 85 (step S41). The location information notification section 85 notifies the LMA of the identification information of the mobile node and that of the MAG. The process is shown in FIG. 8(b). The information flow is shown in FIG. 11(c) (202).

After receiving the location information, the LMA updates the registration information, and notifies the MAG that the update of the location information has been completed (location registration request: 203). The information flow is shown in FIG. 11(d). The details of the process of the LMA will be described later.

The MAG receives a response from the LMA (step S51), and the location information registration section 97 registers the LMA with the location information management table (step S52). The LMA is used as the location information for any mobile nodes except the associated mobile node. The process flow is shown in FIG. 8(c). The MAG performs location registration with the LMA in response to the association request from the mobile node (205). When the mobile node attempts to connect to the network using the multiple transmission/reception devices, each MAG serving as a connection point performs location registration with the LMA (206). The information flow is shown in FIG. 11(e), (f).

When the mobile node is connected to the multiple MAGs, the location registration from the MAG1 serving as one connection point, is achieved in the sequences in FIG. (c), (d), while the location registration from MAG2 serving as the other connection point is achieved by FIG. (e), (f). The MAG1 and MAG2 each perform the location registration, triggered by the request from the mobile node. Accordingly, the same process flows is performed on the MAGs, and may be shown by FIG. 8(b), (c).

In the aforementioned manner, along with the association process of the mobile node, each MAG registers the location information of the mobile node with the LMA while managing the location of the associated mobile node.

(Location Information Creation Process by LMA)

Next, a location information creation process by the LMA will be described.

The LMA acquires location information of the mobile node from the corresponding MAG, and manages the location information. When transferring a packet addressed to the other mobile node, the LMA resolves the MAG with which the other mobile node is associated and achieves the packet transfer. The mobile node has multiple transmitter-receivers each of which connects to the core network to perform the location registration. Thus, the LMA manages the multiple MAGs as location information for the mobile node.

Specifically, in response to the location registration request from one of the MAGs (step S71:202), the location information registration section 97 acquires the location information of the mobile node from the MAG, and registers the information with the location information management table of the storage device (step S72). The information flow is shown in FIG. 11(c). The location information is a correspondence between the identification information of the mobile node and that of the MAG. To identify the mobile node, the global IP address or the MAC address of the mobile node, or the UE-ID defined by a specification such as 3GPP TS23.003V5.2.0 is used. To identify the MAC, the MAG's IP address which allows routing in the core network is used. After the registration, the LMA transmits a response to the location registration request back to the MAG (step S73:203). The process flow is shown in FIG. 9(a). The information flow is shown in FIG. 11(d).

When connected to the core network via multiple transmitter-receivers, the mobile node receives location information notifications from the respective multiple MAGs in the core network. Thus, the LMA registers the multiple MAGs as location information for the mobile node. The information flow is shown in FIG. 11(e), (f).

In the aforementioned manner, the LMA manages the multiple MAGs as location information for single piece of identification information of the mobile node, and thereby can hold location information of the multiple transfer destinations for a packet addressed to the mobile node. Accordingly, multiple communication paths may be established between the mobile nodes. For example, in FIG. 3, even if the mobile node (1)7 selects any default router and then transmits a packet to the mobile node (2)11, the packet will be delivered to the LMA 15. Further, even if the LMA 15 selects any communication path, the packet will be delivered to the mobile-node (2)33. The information may be transmitted/received through two delivery paths shown in FIG. 11 (g) and FIG. 11 (h) (207, 208, 209, 210).

(MAG Selection Units)

Next, a communication path selection process by each mobile node will be described with reference to process flow chart 7(c). The mobile node chooses a communication path by selecting only one MAG from the multiple MAGs to which the mobile node is connected.

The MAG selection section 55 notifies a selected one of the MAGs of MAG selection information. The MAG selection information is transmitted to the selected MAG from the transmitter-receiver wirelessly connected to the MAG. The MAG selection information is information identifying that the selected MAG is to be used preferentially. For example, the MAG selection information is notified by adding a Primary Flag to an Association Request/Reassociation Request of RRC to be transmitted by the mobile node. The preferential use is determined based on the Primary Flag being ON. In the example in FIG. 11, for example, for the association request to the MAG (1)7 (FIG. 11(a): 201), the mobile node 1 sets the Primary Flag ON to notify the MAG (1)7 of the selection, while for the association request to the MAG (2)11 (FIG. 11(b):204), the mobile node 1 sets the Primary Flag OFF to notify the MAG (2)11 of the non-selection.

The notification of the MAG selection information may be made at the time of mobile node activation or a hand-over. In addition, the notification may be made at any time by a user of the mobile node. Furthermore, as shown in FIG. 3, it is possible to detect deterioration of the wireless state of the transmission/reception device used as a Primary out of the multiple transmission/reception devices, replace the Primary, and then to make the notification. Furthermore, it is possible to detect recovered, better wireless state of the other transmission/reception device not used as a Primary out of the multiple transmission/reception devices, replace the Primary with the other transmission/reception device, and then to make the notification. For example, if the wireless state (L1) of the transmission/reception device (1)31a deteriorates, the communications may be continued by replacing the mobile node (1)31 as the Primary with the transmission/reception device (2)31b (L2).

The MAG selection unit may select a MAG based on a capability, such as communication speed, and the state of the transmission/reception device. In addition, a MAG may be selected according to the preference of a user of the mobile node.

Further, the mobile node registers the MAG selection information with the default router list of the storage device 51. For example, the selected MAG is stored in the default router list along with its Primary Flag.

Next, communication path selection process at the MAG will be described with reference to the process flow chart 8(d).

The selected MAG receives the MAG selection information from the mobile node (step S61), and notifies the LMA of the MAG selection information (step S62). For example, the MAG notifies the LMA of the MAG selection information by adding a Primary Flag to the location information for the LMA. By setting the Primary Flag ON, the MAG notifies the LMA that the MAG should be selected preferentially. In the example of FIG. 11, the MAG1 makes a notification by setting the Primary Flag ON for the location registration request to the LMA (FIG. 11(c) 202), while MAG2 makes a notification by setting the Primary Flag OFF for the location registration request to the LMA (FIG. 11(e) 205). The state of ON/OFF for the Primary Flag is determined according to the request from the mobile node.

Next, a communication path selection process by the MAG will be described with reference to the process flow chart 9(b).

The LMA receives the MAG selection information from the MAG (step S81) and registers the MAG selection information with the location information management table (15a in FIG. 3) (step S82), then selects the MAG to transfer a packet (step S83). For example, the location information registration section 97 sets and keeps the Primary Flag ON for the MAG to be selected from the MAGs registered with the location information management table 15a. When transferring the packet, the LMA selects an MAG whose Primary Flag is ON and transfers the packet to the MAG.

Thus, as shown in FIG. 3, the mobile node (1)31 and the LMA 15 can share the preferential use of the path through the MAG (1)7 out of the paths respectively through the MAG (1)7 and the MAG (2)11, between the mobile node (1) 31 and the LMA 15. Again, by using the same approach, the mobile node (2)33 and the LMA 15 can share the preferential use of the path through the MAG (3)17 out of the paths respectively through the MAG (3)17 and through the MAG (4)21, between the mobile node (2) 33 and the LMA 15.

(Packet Transmission/Reception Process)

Next, packet transmission/reception between the mobile nodes will be described by using the network configuration in FIG. 3, the packet format in FIG. 10, and the information flow in FIG. 12.

As shown in FIG. 3, the mobile node (1)31 includes the transmission/reception device (1)31a and the transmission/reception device (2)31b connected to the core network 5 via the MAG (1)7 and the MAG (2)11, respectively. Meanwhile, the mobile node (2)33 includes the transmission/reception device (3)33a and the transmission/reception device (4)33b connected to the core network 5 via MAG (3)33a and MAG (4)33b, respectively. The core network 5 is provided with the LMA 15 which performs the location control of the mobile nodes.

The previously described location registration process has been completed in the location registration step described with reference to FIG. 11, by using the previously described approach. The location registration process is performed so that the mobile node (1)31a uses the transmission/reception device (1)31a as a Primary and the mobile node (2)33 uses the transmission/reception device (3)33a as a Primary.

A case where the mobile node (1)31 transmits a packet to the mobile node (2)33 will be described. The packet format shown in FIG. 10 will be referred to as necessary. The mobile node (1)31 selects the MAG (1)7 from the Primary Flags of the MAGs in the default router list 31c, and transmits a packet by using the MAG (1)7 as the default router (FIG. 10(a): from the mobile node (1)31 to the MAG (1)7).

The MAG (1)7 receives the packet, and resolves the LMA 15 by finding that the destination is not the mobile node associated with the MAG (1)7 from the location information management table 15a, and then transfers the packet to the LMA 15 (FIG. 10(b): from the MAG (1)7 to the LMA 15). In FIG. 10(b), an example of transfer of an encapsulated packet is shown, where the transfer source is the MAG (1)7 and the transfer destination is the LMA 15. Alternatively, the transfer may be performed by using a transfer technique such as GRE tunneling (Non-patent Document 3), or MPLS which is a label switching technique of Layer 2 (Non-patent Document 4).

Figure 10:
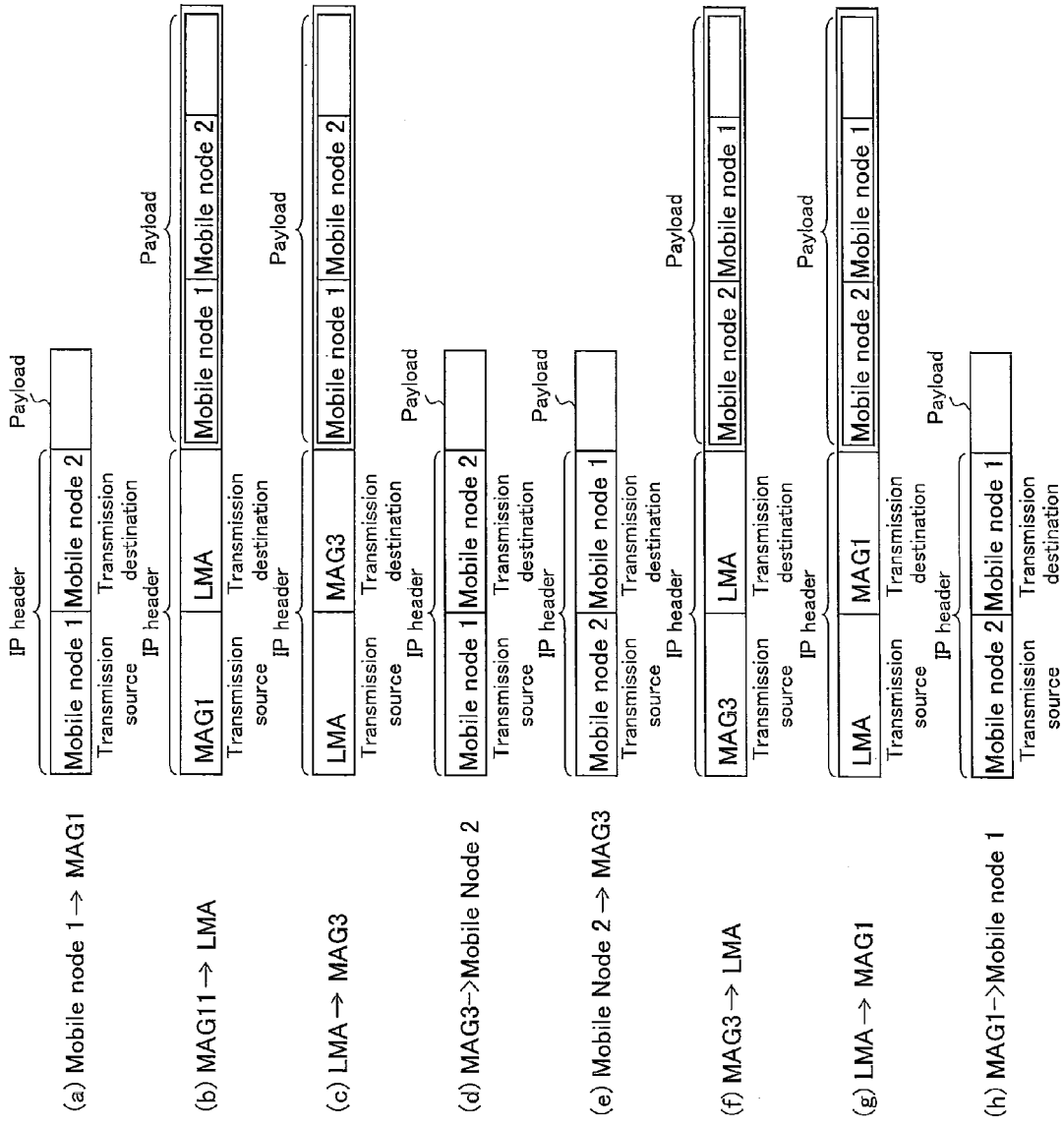
FIG. 10 shows a diagram of one configuration example of a packet format.

The LMA 15 searches an information management table based on the mobile node (2)33 which is the destination of the packet, and acquires the MAG (3)17 whose Primary Flag of the mobile node (2)33 is ON, and transfers the packet to the MAG (3)17 (FIG. 10(*c*): from the LMA 15 to the MAG (3)17). In FIG. 10(*c*), an example of the transfer of the encapsulated packet is shown, where the transfer source is the LMA and the transfer destination is the MAG (3)17. Alternatively, the transfer may be performed by using the transfer technique such as GRE tunneling (Non-patent Document 3), or MPLS which is the label switching technique of Layer 2 (Non-patent Document 4).

Based on the destination address being the mobile node (2)33, the MAG (3)17 resolves that the mobile node (2)33 is a node associated with the MAG (3)17, from the location information management table, and delivers the packet to the mobile node (2)33 (FIG. 10(*d*): MAG (3)).

The mobile node (2)33 receives the packet originated from the mobile node (1)7 and transferred from the MAG (3)17.

A packet originated from the mobile node (2)33, and addressed to the mobile node (1)7 is transferred by performing the above-mentioned processes in reverse order (See FIG. 10(*e*), (*f*), (*g*), (*h*)). In FIG. 12, the following four delivery paths are provided: (a) the packet delivery path 1 between the mobile nodes is, mobile node (1)31-MAG(1)7-LMA 15-MAG (3)17-mobile node (2)33 (221, 222, 223, 224); (b) the packet delivery path 2 between the mobile nodes is, mobile node (1)31-MAG (2)11-LMA 15-MAG (3)17-mobile node (2)33 (225, 226, 227, 228); c) the packet delivery path 3 between the mobile nodes is, mobile node (1)31-MAG (1)7-LMA 15-MAG (4)21-mobile node (2)33 (229, 230, 231, 232); and d) the packet delivery path 4 between the mobile nodes is, mobile node (1)31-MAG (2)11-LMA 15-MAG (4)21-mobile node (2)33 (229, 230, 231, 232).

Here, each mobile node may determine a communication path by selecting a connection point to be a Primary from the multiple MAGs serving as connection points. Specifically in FIG. 12, a mobile communication terminal holds multiple (four) communication paths as shown in FIG. 12 (*a*)-(*d*), and may communicate via the communication path of FIG. 12 (*a*) by the selection based on the primary flag.

In summary, in FIG. 3, suppose a case where a packet is transmitted from the mobile node (1)31. The packet is transmitted to the MAG (1)7 whose Primary Flag is ON by the mobile node (1)31, and is transferred to the LMA 15 from the MAG (1)7. The packet is transferred to the MAG (3)17 whose Primary Flag is ON by the LMA 15, and delivered from the MAG (3)17 to the mobile node (2)33. Reversely, suppose a case where a packet is transmitted from the mobile node (2)33 to the mobile node (1)31. The packet is transmitted to the MAG (3)17 whose Primary Flag is ON by the mobile node (2)33, is transferred to the LMA 15 from the MAG (3)17. The packet is transferred to the MAG (1)7 whose Primary Flag is ON by the LMA 15, and is delivered from the MAG (1)7 to the mobile node (1)31.

Therefore, between the mobile node (1)31 and the LMA 15, the packet may be transmitted/received via the preferred path shared by the mobile node (1)31 and the LMA 15, and between the mobile node (2)33 and the LMA 15, the packet may be transmitted/received via the preferred path shared by the mobile node (2)33 and the LMA 15.

In addition, each mobile node holds other paths in addition to the path using the preferred MAG, thus the preferred MAG is not only the path for packet delivery, and the mobile node will be able to maintain the paths capable of performing packet delivery via other MAGs.

(Hand-over Process by Switching Between Transmitter-receivers)

Next, an example of a handover will be described in which switching is performed between transmitter-receivers on the mobile node 1. Suppose a case where, by the location information registration process described above, as shown in FIG. 3, the mobile node (1) 31 are connected to the MAG (1)7 and the MAG (2)11, and the mobile node (2)33 are connected to the MAG (3)17 and MAG (4)21, so that the communication paths have been established. Furthermore, in this situation, packet transmission/reception are performed after the mobile node (1)31 selects the MAG (1)7, and the mobile node (2)33 selects the MAG (3)17. Specifically, in this situation, the delivery paths of FIG. 12 (*a*) shown in FIG. 12 (221-224) have been selected and communications are made via the delivery paths.

When a communication path is switched to the path via MAG(2)11 by the mobile node (1)31, the mobile node (1)31 can perform switching from the path via MAG (1) to the path via MAG 2 by issuing a notification that the mobile node (1)31 will select the MAG (2), so that a hand-over can be performed. As shown in FIG. 7(*c*), the notification of the selected MAG may be made by the above-described process in which the mobile node selects the MAG.

Figure 8:
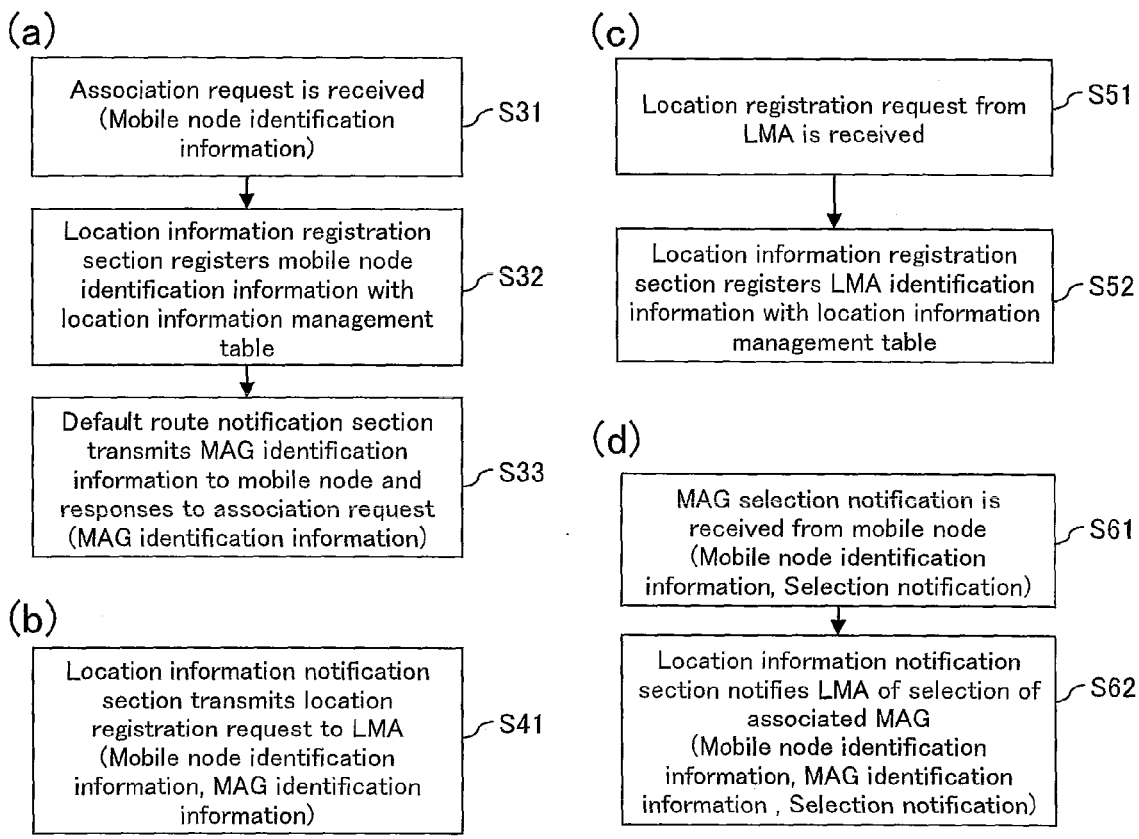
FIG. 8 shows a flowchart of a process flow of an access gateway (MAG).
Figure 9:
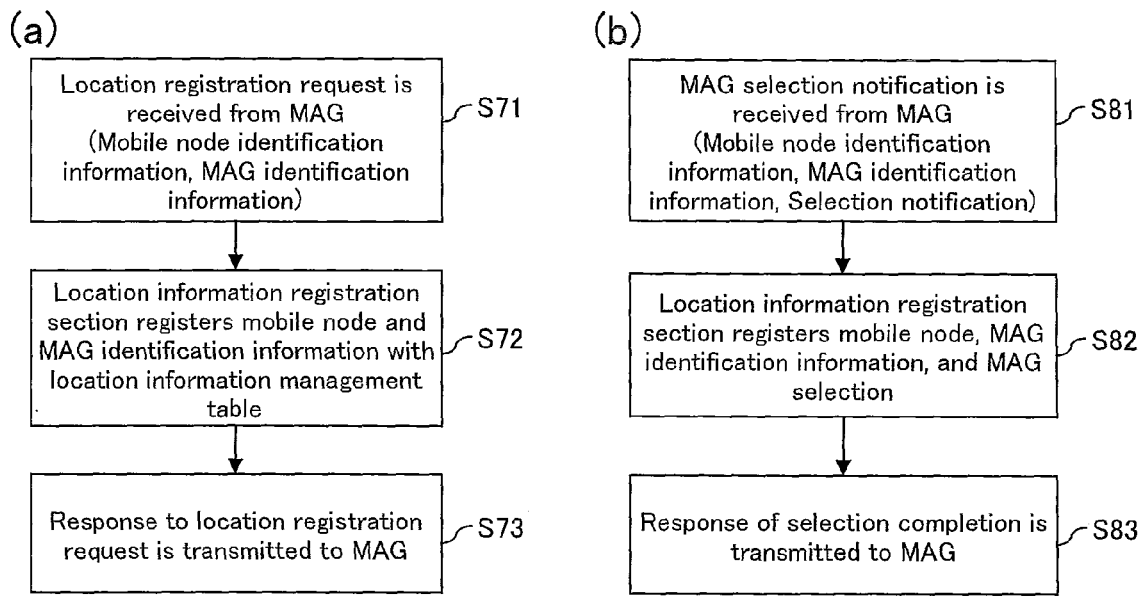
FIG. 9 shows a flow chart diagram of a process flow of a location management device (LMA).

After receiving the selected MAG information from the mobile node, the MAG notifies the LMA of the MAG information. As shown in FIG. 8(*d*), these reception and notification processes may be performed by the above-described process of notification to the LMA by the MAG. The LMA receives the notification from the MAG, and switches the MAG to be used preferentially from the MAG (1)7 to the MAG (2)11. As shown in FIG. 9(*b*), the process can be achieved by performing the above-described MAG selection process by the LMA (from step S81 to step S83).

In other words, in a state where paths via the multiple MAGs have been established between the mobile node and the LMA, a hand-over may be performed to maintain the communications by changing the MAGs. The change of MAGs is achieved by holding the multiple MAGs in the default router list held by the mobile node and then switching between the Primary Flags of the MAGs, and by holding the multiple MAGs for the mobile node in the location information management table held by the LMA and then switching between the Primary Flags of the MAGs.

Specifically, in FIG. 3, the mobile node 1 sets the Primary flag assigned to the MAG (1)7 in the default router list to OFF, and the Primary Flag of the MAG (2)11 to ON, and then switches MAG to be used preferentially from the MAG (1)7 to the MAG (2)11. Then, the LMA 15 is notified that the MAG (2)11 will be used preferentially. The LMA 15 sets the Primary Flag of MAG (1)7 in the location information management table 15*a* to OFF, and the Primary Flag of the MAG (2)11 to ON.

Thus, suppose a case where a packet is transmitted from the mobile node 1(31) in the communications between the mobile node (1)31 and the mobile node (2)33. The packet is transmitted to the MAG (2)11 whose Primary Flag is ON by the mobile node (1)31, and is transferred to the LMA 15 from the MAG (2)11. The packet is transferred to the MAG (3)17 whose Primary Flag is ON by the LMA 15, and is delivered to the mobile node (2)33 from the MAG (3). Reversely, suppose a case where a packet is transmitted from the mobile node (2)33 to the mobile node (1)7. The packet is transmitted to the MAG (3)17 whose Primary Flag is ON by the mobile node (2)33, and is transferred to the LMA 15 from the MAG (3)17.

The packet is transferred to the MAG (1)7 whose Primary Flag is ON by the LMA 15, and is delivered from the MAG (1)7 to the mobile node (1)31. Consequently, the communication on the delivery paths (221-224) in FIG. 12(a) is maintained by the delivery paths (225-228) in FIG. 12(b).

Therefore, in the communications from the mobile node (1)31, a hand-over can be performed by switching between paths while maintaining the multiple paths through the multiple MAGs. Such a hand-over that the primary flag of a mobile node is switched will achieve a hand-over in which the mobile node switches between the multiple access systems available to the mobile node and thereby the communications are continued.

As described above, according to this embodiment, a concurrent connection of the mobile node to the core network by using the multiple network access systems is achieved, and thereby the multiple paths can be established. The mobile node can hold the multiple network connection points, and can transmit a packet according to a selection made by the mobile node. The packet transmitted by the mobile node is transferred by the MAG and is delivered to the LMA. The LMA holds the multiple pieces of location information for the mobile node. The location information is MAGs, and the LMA may select an MAG from the multiple MAGs according to a request by the mobile node to deliver the packet to the MAG Receiving the packet from the LMA, the MAG delivers the packet to a mobile node serving as a communication partner, thus the communications between the mobile nodes can be achieved. A path to be used preferentially can be selected among the multiple paths at any time according to wireless states of the wireless access systems connected by the mobile node or a profile of application used, for example. The communication may also be continued by performing a hand-over in which the mobile node switches between the wireless access system in use by changing the path to be used preferentially in wireless access systems available to the mobile node.

The system mobile node according to this embodiment is a next generation communication terminal provided by, for example, a communication carrier, and the core network is a communication carrier network. Since the network access systems supported by the communication carriers have diversified, a model is expected, which allows connection of a terminal by using multiple access systems such as a cellular access system and a wireless LAN. Further, the system is a system which allows the terminal to connect to those access systems concurrently.

INDUSTRIAL APPLICABILITY

The present invention is applicable to a packet communication system complying with the Edge Mobility. For example, the present invention is applicable to a system which includes a mobile terminal having one wireless transmitter-receiver connected to a cellular network and another transmitter-receiver connected to a wireless LAN, allowing concurrent connection to the respective transmitter-receivers while communicating by using a single IP address.

The invention claimed is:

1. A mobile node in a packet communication system complying with the Edge Mobility and configured by including: a mobile node; first and second access gateways; and a location management device holding the first and second access gateways as location information of the mobile node and setting a corresponding one of the first and second access gateways as a transfer destination of a packet addressed to the mobile node, the first and second access gateways connecting to a network through first and second access systems, which are distinct, of the mobile node and serving as respective connection points for the first and second access systems within a single core network that communicates with a single IP address, the location management device being a single location management device managed within the core network, the mobile node comprising:

a location registration notification unit including first and second transmitter-receivers respectively using the first and second network access systems connected to the core network, the first and second transmitter-receivers being configured to respectively request connection to the first and second access gateways to be connected with, the location registration notification unit being configured to cause location registrations to be performed from the first and second access gateways, respectively, with respect to the location management device;

a storage unit for acquiring and storing path information in the single core network that communicates with the single IP address and for the first and second access systems with respect to the first and second access gateways to be connected with via the first and second access systems of the respective first and second transmitter-receivers and for storing the path information;

a selection unit for selecting an access gateway to be preferentially used from the plurality of access gateways connected; and a transmission unit for transmitting a packet to the selected access gateway based on the path information.

2. The mobile node according to claim 1, further comprising:

a notification unit for notifying of the access gateway thus selected.

3. The mobile node according to claim 2, wherein the selection unit selects an access gateway to be preferentially used on a basis of primary information stored in a location information management table provided in the location management device.

4. The mobile node according to claim 1, wherein the access systems are systems in a wireless LAN and a cellular phone.

5. An access gateway in a packet communication system complying with the Edge Mobility and configured by including: a mobile node; first and second access gateways; and a location management device holding the first and second access gateways as location information of the mobile node and setting a corresponding one of the first and second access gateways as a transfer destination of a packet addressed to the mobile node, the first and second access gateways connecting to a network through first and second access systems, which are distinct, of the mobile node and serving as respective connection points for the first and second access systems within a single core network that communicates with a single IP address, the location management device being a single location management device managed within the core network, the access gateway comprising:

a unit for performing, with respect to the location management device, a location registration of a mobile node associated with the access gateway itself, for receiving a notification of access gateway selection with respect to the associated mobile node, and for notifying the location management device of the selected access gateway, the location management device comprising:

a storage device for acquiring and registering the first and second access gateways as location information for the mobile node, for acquiring an access gateway selected by the mobile node, and for registering selection information; and a packet transmission unit for transmitting a packet to the mobile node based on the selected access gateway and the location information.

6. A location management device in a packet communication system complying with the Edge Mobility and configured by including: a mobile node; first and second access gateways; and a location management device holding the first and second access gateways as location information of the mobile node and setting a corresponding one of the first and second access gateways as a transfer destination of a packet addressed to the mobile node, the first and second access gateways connecting to a network through first and second access systems, which are distinct, of the mobile node and serving as respective connection points for the first and second access systems within a single core network that communicates with a single IP address, the location management device being a single location management device managed within the core network, the location management device comprising:

a registration unit for acquiring and registering the first and second access gateways as location information for the mobile node, for acquiring an access gateway selected by the mobile node, and for registering selection information, wherein the location management device performs, within the core network, location management in which the first and second access gateways that serve as the respective connection points within the single core network that communicates with the single IP address are held as the location information of the mobile node and in which the corresponding one of the first and second access gateways is set as the transfer destination of the packet addressed to the mobile node.

7. A packet communication system complying with the Edge Mobility and configured by including: a mobile node; first and second access gateways; and a location management device holding the first and second access gateways as location information of the mobile node and setting a corresponding one of the first and second access gateways as a transfer destination of a packet addressed to the mobile node, the first and second access gateways connecting to a network through first and second access systems, which are distinct, of the mobile node and serving as respective connection points for the first and second access systems within a single core network that communicates with a single IP address, the location management device being a single location management device managed within the core network, the packet communication system comprising:

the mobile node comprising:

a location registration notification unit including first and second transmitter-receivers respectively using the first and second access systems connected to the core network, the first and second transmitter-receivers being configured to respectively request connection to the first and second access gateways to be connected with, the location registration notification unit being configured to cause location registrations to be performed from the first and second access gateways, respectively, with respect to the location management device;

a storage unit for acquiring and storing path information in the single core network that communicates with the single IP address and for the first and second access systems with respect to the first and second access gateways to be connected with via the first and second access systems of the respective first and second transmitter-receivers;

a selection unit for selecting, from the first and second access gateways to be connected with, an access gateway that is to be used preferentially;

a notification unit for making a notification regarding the selected access gateway; and a packet transmission unit for transmitting a packet to the selected access gateway;

the first and second access gateways each comprising a unit for performing, with respect to the location management device, a location registration of a mobile node associated with the access gateway itself, for receiving a notification of access gateway selection with respect to the associated mobile node, and for notifying the location management device of the selected access gateway; and the location management device comprising:

a storage device for acquiring and registering the first and second access gateways as location information for the mobile node, for acquiring an access gateway selected by the mobile node, and for registering selection information; and a packet transmission unit for transmitting a packet to the mobile node based on the selected access gateway and the location information.

8. A mobile node control method for a packet communication system complying with the Edge Mobility and configured by including: a mobile node, first and second access gateways; and a location management device holding the first and second access gateways as location information of the mobile node and setting a corresponding one of the first and second access gateways as a transfer destination of a packet addressed to the mobile node, the first and second access gateways connecting to a network through first and second access systems, which are distinct, of the mobile node and serving as respective connection points for the first and second access systems within a single core network that communicates with a single IP address, the location management device being a single location management device managed within the core network, the control method comprising:

a location registration notification step in which first and second transmitter-receivers, which respectively use the first and second access systems connected to the core network, respectively request connection to the first and second access gateways to be connected with, and in which location registrations are caused to be performed from the first and second access gateways, respectively, with respect to the location management device;

a storage step in which path information in the single core network that communicates with the single IP address and for the first and second access systems with respect to the first and second access gateways to be connected with via the first and second access systems of the respective first and second transmitter-receivers is acquired and stored;

a step of selecting an access gateway to be preferentially used from the plurality of access gateways connected;

a step of notifying of the access gateway thus selected; and a step of transmitting a packet for the selected access gateway.

9. A non-transitory computer readable medium storing a program which when executed by a processor causes the processor to perform a mobile node control method for a packet communication system complying with the Edge Mobility and configured by including: a mobile node, first and second access gateways; and a location management device holding the first and second access gateways as location information of the mobile node and setting a corresponding one of the first and second access gateways as a transfer destination of a packet addressed to the mobile node, the first and second access gateways connecting to a network through first and second access systems, which are distinct, of the mobile node and serving as respective connection points for the first and second access systems within a single core network that communicates with a single IP address, the location management device being a single location management device managed within the core network, the control method comprising:

a location registration notification step in which first and second transmitter-receivers, which respectively use the first and second access systems connected to the core network, respectively request connection to the first and second access gateways to be connected with, and in which location registrations are caused to be performed from the first and second access gateways, respectively, with respect to the location management device;

a storage step in which path information in the single core network that communicates with the single IP address and for the first and second access systems with respect to the first and second access gateways to be connected with via the first and second access systems of the respective first and second transmitter-receivers is acquired and stored;

a selecting step in which an access gateway to be preferentially used is selected from the first and second access gateways; and a transmitting step in which a packet is transmitted to the selected access gateway based on the path information.

10. The mobile node according to claim 2, wherein the access systems are systems in a wireless LAN and a cellular phone.

11. The mobile node according to claim 3, wherein the access systems are systems in a wireless LAN and a cellular phone.

12. The non-transitory computer readable medium according to claim 9, wherein the mobile node control method further comprises a step in which, from among a plurality of access gateways, a frequently used access gateway is selected, a notification is made regarding the selected access gateway, and a packet is transmitted to the selected access gateway.

* * * * *